(No Model.)
J. JOHNSON.
RACKING OFF APPARATUS FOR BEER, WINE, AND OTHER LIQUIDS.
No. 398,261. Patented Feb. 19, 1889.
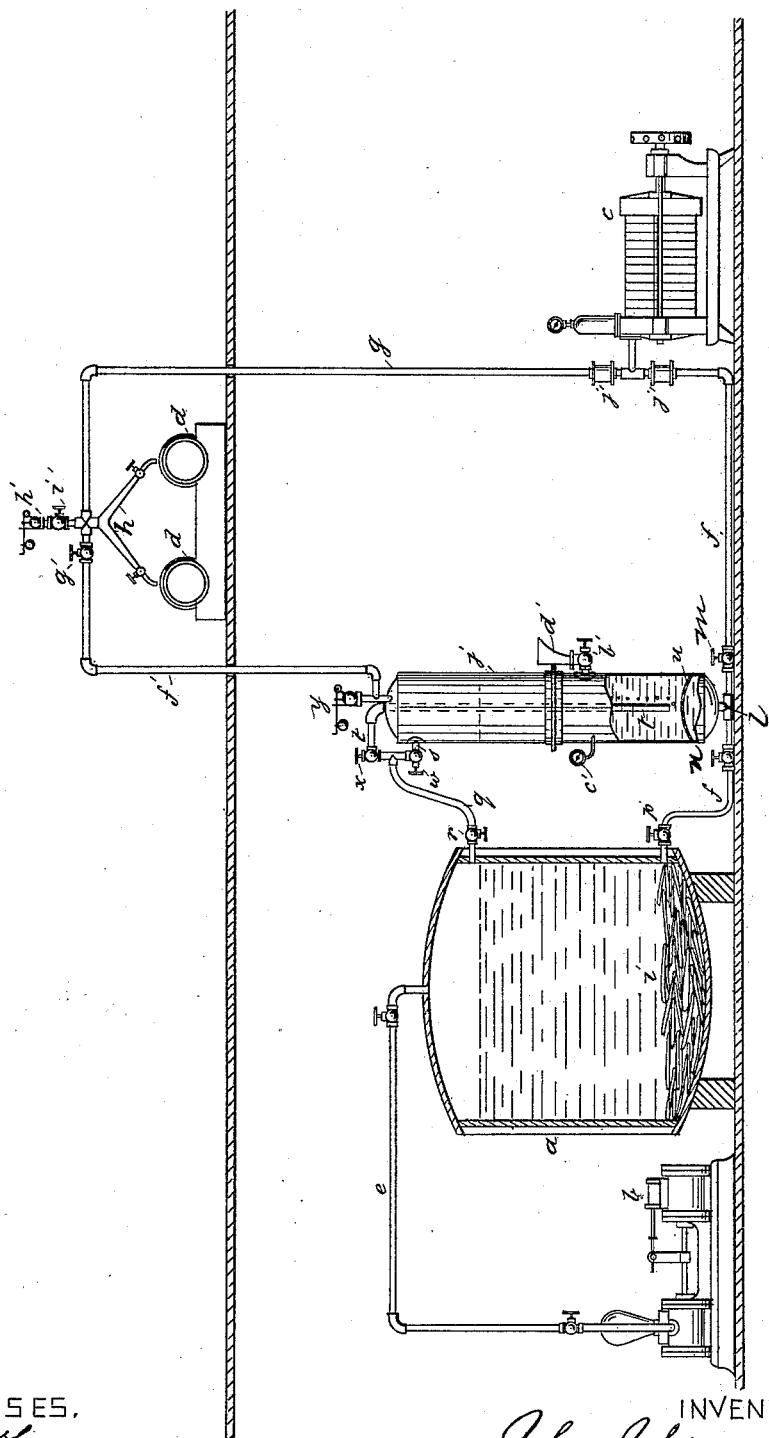
WITNESSES.
Wm. A. Lowe
O. J. Morgan
INVENTOR.
John Johnson
A. P. Thayer
Atty

UNITED STATES PATENT OFFICE.

JOHN JOHNSON, OF BROOKLYN, NEW YORK.

RACKING-OFF APPARATUS FOR BEER, WINE, AND OTHER LIQUIDS.

SPECIFICATION forming part of Letters Patent No. 398,261, dated February 19, 1889.

Application filed April 30, 1888. Serial No. 272,366. (No model.)

*To all whom it may concern:*

Be it known that I, JOHN JOHNSON, a citizen of the United States, and a resident of Brooklyn, in the county of Kings and State of New York, have invented certain new and useful Improvements in Racking-Off Apparatus for Beer, Wine, and other Liquids, of which the following is a specification.

My invention consists of a contrivance of apparatus for mixing and combining filtering material, as cellulose, with the beer on its way from the racking-cask to the filter instead of mixing them in the racking-cask, as heretofore done, by which better and more uniform mixing and better effects in filtering are obtained, besides avoiding the clogging of the racking-cask by the mixture and lodgment of the filtering material with the yeast in the lower portion of the cask, all as hereinafter fully described, reference being made to the accompanying drawing, in which I have represented racking apparatus contrived according to my invention, partly in side elevation and partly in sectional elevation.

I employ the same form or kind of racking-cask $a$, force-pump or air-compressor $b$, and filter $c$ as are commonly employed, or may employ any other approved forms suitable for the purpose, the operation of which is, in the common way, simply forcing the beer by means of compressed air from the pump out of the racking-cask, through the filter, into the shipping-kegs $d$, the pump being connected with the cask by the pipe $e$ for the delivery of the compressed air into the cask to act on the beer, with which the cask is previously filled in the usual way as it is produced, the cask and the filter being connected by the pipe $f$ for the discharge of the beer from the cask into the filter, and the filter having a suitable discharge-pipe, $g$, with one or more branches, $h$, suitably arranged for filling one or more kegs, $d$, at once, or for turning the beer from one keg to another as they are filled one after another.

It has been found that better results can be obtained in filtering the beer by charging the filtering material, as cellulose, in a finely-comminuted state, into the beer to enter the filter with it and be there separated, instead of packing the cells of the filter to begin with, because when so packed the deposit is all or mainly lodged in a small locality of the packing where the liquor enters the same, which soon becomes clogged, while the larger portion of the packing is yet in good working condition, but not accessible to the beer, whereas by the mixture of the filtering material with the beer in fine particles, so as to flow along with it and gradually pack in the cells of the filter by separation therein from the beer, there is greater uniformity of action throughout the whole of the spaces of the cells and less localization in the matter of clogging by the matters filtered out of the beer and the action of the press is more rapid; but mixing the filtering material with the beer in the racking-cask is objectionable, because it is important that the beer remain as quiet therein as possible to avoid separation of the gas it contains, and which it is important shall be retained and delivered with the beer into the shipping-kegs. It is also objectionable in the racking-cask, because of mixing with and clogging in the yeast usually collected on chips $i$ in the bottom of the cask for separating from the beer. I therefore propose to employ a feeder or distributer for the filtering material, consisting, essentially, of a tank, $j$, closed at both ends and set upright, and connected by a pipe, $l$, at the lower end with the pipe $f$, through which the beer flows from the racking-cask to the filter, said pipe $f$ having a stop-valve, $m$, between the distributer and the filter; also a stop-valve, $n$, in close proximity to and between it and the racking-cask, and also a stop-valve, $p$, where it connects with the racking-cask. The distributer extends preferably a little higher than the racking-cask, and is connected at the upper end with the racking-cask near its top by the pipe $q$, having two branches entering the distributer, one, $s$, opening into the upper space and the other, $t$, having a dip-extension down within the distributer and discharging just over, or it may be below, a false foraminous bottom, $u$, said pipe having a stop-valve, $r$, near the racking-cask, branch $s$ having a stop-valve, $w$, and the dip branch $t$ also having a stop-valve, $x$. The distributer also has a relief or safety valve, $y$, at the top, and at a suitable distance above the bottom it has a charging-hopper, $d'$, attached to its side and provided with a stop-valve, $b'$, to close the passage after the filtering material has been charged into said distributer, and said distributer is also preferably provided with a pressure-gage, $c'$. It will now be understood that when a proper quantity of the filtering material has been charged into the distributer and the passage closed by stop-valve $b'$, and passages $f$ and $q$ opened (the latter through branch $s$) to allow the beer to rise therein level with what remains in the cask, there will be a uniform distribution of the filtering material into the beer passing from the cask $a$ into the filter $c$, as a proportionate amount of beer charged with the filtering material will also be drawn from the distributer and will flow along with the rest.

The foraminous false bottom $u$ prevents the too rapid escape of the filtering material, which has a tendency to settle, and the dip branch $t$, through which the air flows from cask $a$ to maintain the equilibrium as the beer-level falls, (valve $w$ being closed,) causes action of the beer by discharging the air near the bottom, so as to rise up through the beer, that tends to prevent the settling of the filtering material, and greater action may be produced from time to time, as may be required, by opening safety-valve $y$ and allowing some air to escape.

In preparing the apparatus for operation the distributer is charged full of air from cask $a$ or from the pump up to the pressure in said cask through pipe $q$ after the filtering material has been introduced and before the beer is allowed to flow into the distributer, the object being to oppose the beer by pressure in the distributer equal to that in the cask to avoid the escape of gas from the beer that would occur by expansion in case of being allowed to flow unobstructedly from the cask wherein it is subject to pressure into the distributer free of pressure, the air in this case passing through either or both of the branches $s\ t$. When the beer is admitted after the distributer is thus filled with air, the air flows back into the cask $a$ through branch $s$, the branch $t$ being trapped by the beer as soon as it rises above the lower end of said branch.

When the distributer is filled with beer to the level of the beer in the cask, branch $s$ is closed by stop-valve $w$, and thereafter remains closed until the proper time for opening it again in recharging the apparatus. Two separate pipes may of course be employed instead of the one $q$ and its two branches. For similarly preventing expansion and escape of gas from the beer on being admitted to the filter I establish back-pressure therein also before opening the passage between the distributer and the filter through pipe $f$, and for this purpose I connect the press with the distributer $j$, or it may be cask $a$ above the beer-level, by the pipe $f'$, having a stop-valve, $g'$, to shut it off when required to allow the filter and discharge pipes to fill with compressed air before opening said passage $f$. I prefer to make this connection with the filter discharge-pipe $g$ where it connects with the branches $h$, and provide a safety-valve, $h'$, which, being set to open by a little lower pressure than will open valve $y$, opens and shows when the filter is full of air. Then I shut off pipe $g'$, open pipe $f$, connecting the distributer with the filter, and set the pump in motion. This forces the beer charged with the filtering material forward into the filter subject to the back-pressure of the air now controlled by safety-valve $h'$, the beer following the air and forcing it out through said valve. When the air has all been forced out and the beer shows at said valve $h'$, the escape of the beer through it is shut off by the stop-valve $i'$ just below said safety-valve, and the valves in the branches $h$ are opened and the filling of the kegs is begun without waste of gas from the beer.

The pipes $f$ and $g$, through which the beer enters and discharges from the filter, are each provided with a sight-glass at $j'$, through which to observe the conditions of the beer.

Any form of filter apparatus may be employed, provided it is closed and capable of sustaining a pressure and delivering the filtrate against a pressure, and it is unnecessary to represent the same in detail.

It will be understood that the filtering-material distributer will be alike useful in case it may be preferred to force the beer or any other liquid it may be desired to filter in this manner directly through the racking-cask without the employment of compressed air, and it will also be the same in case of an arrangement for the liquor to flow by gravitation instead of being operated by a pump, and my invention includes these contrivances as well.

What I claim, and desire to secure by Letters Patent, is—

1. The combination, with a racking-cask and filter, of the intermediately-placed filtering-material distributer connected with the delivery-pipe from the cask to the filter for discharging thereinto, and also connected with the cask for circulation of the compressed air above the beer-level, substantially as described.

2. The combination, with a racking-cask, air-compressor or force-pump, and filter, of the intermediately-placed filtering-material distributer connected with the delivery-pipe from the cask to the filter for discharging thereinto, and also connected with the cask for circulation of the compressed air above the beer-level, substantially as described.

3. The combination, with a racking-cask, air-compressor or force-pump, and filter, of the intermediately-placed filtering-material distributer connected with the delivery-pipe from the cask to the filter for discharging thereinto, also connected with the cask for circulation of the compressed air above the beer-level, and the discharge-pipe of the filter connected with the cask or distributer for establishing back-pressure on the beer, substantially as described.

4. The combination, with the racking-cask, air-compressor or force-pump, and filter, of the intermediately-placed filtering-material distributer connected with the delivery-pipe from the cask to the filter for discharging thereinto, also connected with the cask by the dip-pipe for the inflow of air from the cask through the beer in the distributer, and also having direct connection with the cask above the beer-levels in the cask and distributer, substantially as described.

5. The combination, in apparatus for racking beer and other liquids, of the racking-cask, air-compressor or force-pump, filtering-material distributer, filter, discharge-pipe of the racking-cask and distributer connected with the filter, filter discharge-pipe, air-pipe connecting the distributer or cask and the discharge-pipe of the filter, safety-valve in said filter discharge-pipe, and the stop-valves in the racking-cask and distributer discharge-pipe and in the filter discharge-pipe safety-valve, substantially as described.

6. The combination, in apparatus for racking beer and other liquids, of the racking-cask, air-compressor or force-pump, filter, and filtering-material distributer, said distributer having the charging-hopper and foraminous false bottom, and being connected with and so as to discharge into the discharge-pipe from the racking-cask to the filter, and also connected with the racking-cask above the beer-levels in each, substantially as described.

7. The combination, in apparatus for racking beer and other liquids, of the racking-cask, air-compressor or force-pump, filter, and filtering-material distributer, said distributer being connected with and so as to discharge into the discharge-pipe from the racking-cask to the filter, also connected with the racking-cask above the beer-level in it by the dip-pipe discharging below the beer-level in said distributer, and having the relief or safety valve to accelerate the mixture of the filtering material with the beer in said distributer, substantially as described.

Signed at New York city, in the county and State of New York, this 24th day of April, A. D. 1888.

JOHN JOHNSON.

Witnesses:
W. J. MORGAN,
F. N. THAYER.